United States Patent [19]

Pieper

[11] 4,213,002

[45] Jul. 15, 1980

[54] ELECTRICALLY HEATED MELTING FURNACE FOR MINERAL MATERIALS

[75] Inventor: Helmut Pieper, Lohr, Fed. Rep. of Germany

[73] Assignee: Sorg GmbH & Co. KG, Lohr, Fed. Rep. of Germany

[21] Appl. No.: 964,555

[22] Filed: Nov. 29, 1978

[51] Int. Cl.² ........................... C03B 5/02; C03B 5/26
[52] U.S. Cl. ............................................................. 13/6
[58] Field of Search ................................. 13/6, 23, 33

[56] References Cited

U.S. PATENT DOCUMENTS

| | | | |
|---|---|---|---|
| 3,580,976 | 5/1971 | de Bussy | 13/6 |
| 3,912,488 | 10/1975 | Sanford | 13/6 X |

FOREIGN PATENT DOCUMENTS 2226328  11/1975  Fed. Rep. of Germany ............... 13/6

*Primary Examiner*—Roy N. Envall, Jr.
*Attorney, Agent, or Firm*—Sprung, Felfe, Horn, Lynch & Kramer

[57] ABSTRACT

An electrically heated melting furnace for the Melting of mineral materials, such as frits, (Vitreous) enamels and the like, wherein a bath of molten material (contained in a tank) is heated by means of electrodes contacting the molten material and having a current flowing therethrough which heats the molten material by Joule's heat, wherein a batch is fed onto the melt or molten bath, and the molten product is withdrawn from the bottom of the tank, wherein the furnace space or tank has the cross-section of a regular polygon; and wherein a plurality of heating elements are arranged above the batch material and said heating electrodes are positioned in the lower portion of the molten bath above the tank bottom, and comprising a bottom outlet including a cylindrical portion or element and a further underlying, concentrically disposed, circular discshaped or annular portion or element of a refractory material being conductive at high temperature and acting as an electrical conductor, and at least one counter or opposite electrode disposed above the outlet and being immersed into the molten bath, said electrode likewise being connected to the power source.

6 Claims, 3 Drawing Figures

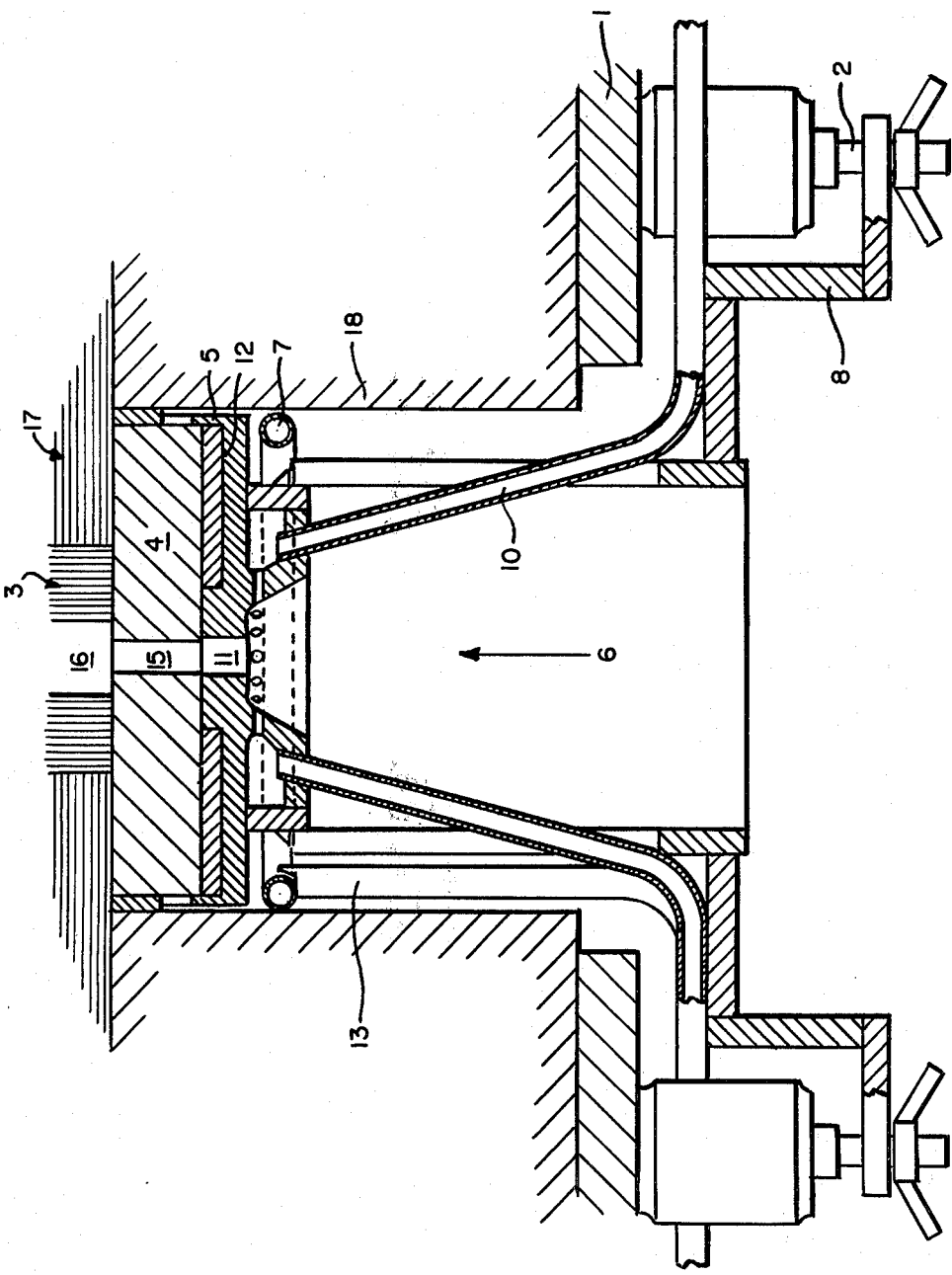

ELECTRICALLY HEATED MELTING FURNACE FOR MINERAL MATERIALS

The present invention relates to an electrically heated melting furnace for the melting of mineral materials, such as frits, (vitreous) enamels and the like or glass, wherein a bath of molten material (contained in a tank) is heated by means of electrodes contacting the molten material and having a current flowing therethrough which heats the molten material by Joule's heat, wherein a batch is fed onto the melt or molten bath, and the molten product is withdrawn from the bottom of the tank.

Furnaces are known for the melting of mineral materials and especially frits, (vitreous) enamels and the like, wherein the conventional, shallow bath of molten material is heated from above by the heat produced by gas or oil burners, and wherein the molten mass is withdrawn either directly through the bottom or through a lateral outlet including a riser and feeder. However, these conventional furnaces suffer from the drawback of releasing great quantities of emission to the environment, which emission includes particularly the exhaust gases of the burners and the, in part toxic, gases released from the batch. Further, it is disadvantageous in these furnaces that their volume is required to be large as compared to the capacity thereof, such that these furnaces are expensive to construct and such that their efficiency is low; this means that a great energy demand per unit of weight of molten material is unavoidable.

Still further, a furnace developed by the applicant is known, which furnace in addition to the conventional mode of heating by oil or gas burners, is also provided with a heating system in the form of electrodes immersed into the molten material. However, it is still disadvantageous in this prior furnace that a relatively shallow tank containing molten material is present in which the surface losses are not kept at the desired minimum level.

In view of this, it is the object of the present invention to provide a melting furnace particularly for frits, enamels and other mineral materials, which does no longer suffer from the abovementioned drawbacks and which offers optimum efficiency, with respect to consumption of thermal energy.

Furthermore, the furnace according to the present invention should be inexpensive, of compact and small-size construction, while nevertheless offering an extremely high capacity, namely an extremely high rate of throughput. This furnace should lend itself to be controlled without difficulty and in easy manner, and the quality of the molten materials should be improved as compared to the quality obtained by conventional furnaces. The exhaust gases should lend themselves to be fully decontaminated, and, in particular, the flow through the outlets should lend itself to be controlled by most simple means independently of the level of the surface of the molten glass bath. Still further, the furnace according to the invention including the components thereof should have a long operational life, and reconstruction of the furnace should be possible readily and in a short period of time.

It is another object of the present invention to improve the melting furnace or its bottom outlet in such a way as to render possible by the arrangement of the cooling pipes (tubes) to constantly keep in operation the cooling system and to thereby positively prevent leakage of the molten material adjacent the outlet proper.

Still further, this construction should allow to control the quantity discharged within any limits desired and, regardless of the cooling pipes, to positively avoid "freezing" of the outer regions of the outlet even in discontinuous operation or to melt free the outlet in resuming the operation once freezing has occured.

Also, the components of the outlet which to a particularly high degree are subject to wear, should be adapted to be easily replaced without interrupting operation of the furnace.

According to the present invention, this object is solved in that the furnace space or tank having the molten bath therein has a square or almost square cross-section or the cross-section of a regular polygon; and that a plurality of heating elements are arranged above the batch material and the heating electrodes are positioned in the lower portion of the molten bath above the tank bottom.

In particular, for the control of the required temperature of the outflowing material and especially for the control of the quantity discharged per unit of time, the bottom outlet is formed in such a manner that it includes a cylindrical portion or element and a further underlying, concentrically disposed, circular disc-shaped or annular portion or element of a refractory material being conductive at high temperature and acting as an electrical conductor, which elements are conductively coupled to a current supply line.

In order to obtain a particularly compact structure, both the circular disc, the mounting means thereof and the annular cooling water passage are provided within an aperture in the refractory material of the tank bottom.

In greater detail, the bottom outlet is preferably formed such that the circular disc-shaped element is mounted within a metallic annular element and supported by the bottom plate thereof, and that an annular cooling passage is attached to the annular element.

Further, in order that the outlet in discontinuous operation may be melted free at any time, and in order to provide for improved control of the outflowing (discharged) molten material, the construction is preferably such that a shell of a heat resistant metal is disposed below said bottom plate, said shell having inserted therein a cylindrical part of refractory material and having a central aperture, and that said shell is surrounded, with a spacing, by an induction coil through which high-frequency alternating current flows.

Facilitated replacement is provided by the feature that said shell is adapted to be threaded onto a depending annular flange of said annular element.

As the invention in a structurally ready manner solves the problems accompanying a bottom outlet for the melting of even aggressive mineral substances, while at the same time improving the control and rendering possible the replacement of the components subject to wear even during operation of the furnace, it may be spoken of an ideal solution to the existing problems.

Below, an exemplary embodiment of the invention is explained in greater detail by referring to the enclosed drawings, wherein:

FIG. 2 is a vertical sectional view of a bottom outlet according to the invention.

Figure 1:
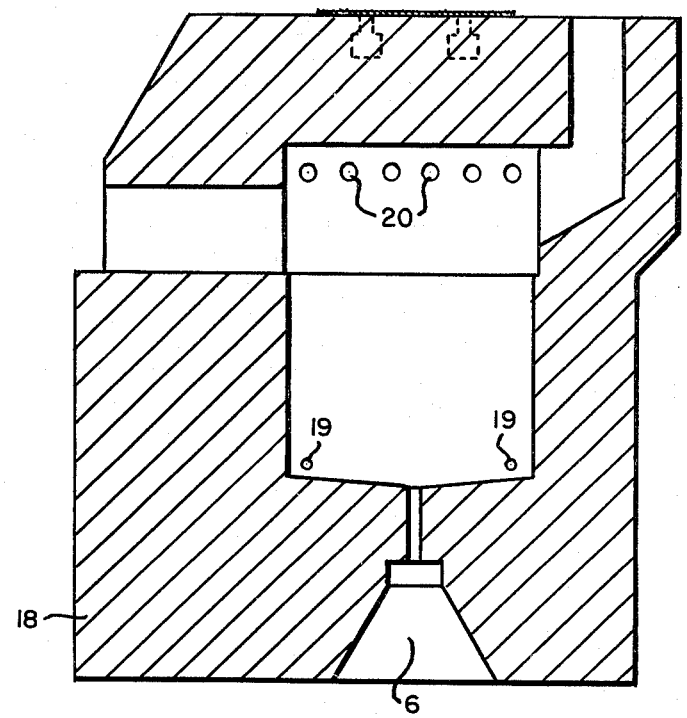
FIG. 1 shows a schematical longitudinal sectional view of the furnace according to the invention.

As shown in the FIG. 1, the furnace according to the invention is formed of customary refractory material 18 defining a bottom, the sidewalls, a roof and the other elements of the furnace as are well known in furnace construction. The furnace is completed by a not illustrated supporting frame as well as by a feeding or charging device, a gas exhaust and the like. As these portions do not form part of the present invention but are subject to the expert's choice, any further description of these components may be dispensed with.

The furnace proper contains a tank with molten material to which a mixture or batch is fed from above and which has a rectangular, particularly square, or regularly polygonal cross-section, with the height of the bath of the molten material corresponding for small furnaces approximately to the diameter thereof or, in the case of a square cross-section, to the length of one side of the square.

The bottom portion of the furnace has mounted therein a bottom outlet 6 which may be installed either directly below the molten bath or connected thereto through a lateral outlet.

Radiator heating rods 20 or conventional burners are positioned above the batch in the tank, which heating elements serve to heat the batch to such degree that the latter readily melts on the existing small surface area. Also, these heating elements may be used for initially melting the batch without requiring a melt to be provided and heater electrodes 19 to be put into operation. Interiorly of the tank, especially slightly above the bottom of the furnace, the heater or counter electrodes 19 are provided, which electrodes cooperate with each other, but also with corresponding conductive surfaces provided within the bottom outlet. In conventional manner, the electrodes are connected to the electric mains through electrode holders, supply lines or cables and regulating (variable) transformers.

These components, including the electrodes, which may be formed of molybdenum or, optionally, stannous oxide, likewise belong to the prior art and are subject to the expert's choice such that these components need not be explained in any greater detail. The bottom outlets provided in the bottom of the furnace or of the riser as well in the feeder and generally indicated at 6, are formed both of metallic material, e. g. "Inconel", and melt-cast refractory material having a vitreous phase and therefore being conductive at high temperatures, even if with a high electric resistance, or of materials of comparable properties.

As shown in FIG. 2, the bottom outlet according to the invention comprises a cylindrical portion 3 or element having a center aperture 16, and an underlying circular ring-shaped or annular disc-shaped portion or element 4 having a center aperture 15, both elements being formed of melt-cast refractory material and being retained in an annular element 5 made of Inconel, platinum, stainless steel or other suitable material.

Annular element 5 receives or embraces the lower edge of element 4 the bottom face of which rests on a bottom plate 12 of annular element 5. This bottom plate 12 is provided with a center aperture or bore 11 the cross-sectional area of which is slightly greater than that of the center aperture 15 of element 4 which, in turn, is substantially smaller than the center aperture 16 of element 3.

Below the bottom plate 12 and adjacent to the outer edge thereof, an annular passage 7 for cooling water is provided, which passage may be supplied with cooling water or a different coolant via further cooling pipes 13.

Both the bottom plate 12 including the annular element 5 and, thus, also elements 3 and 4, as well as the annular cooling water passage 7 are supported by a supporting frame 8 being mounted to the bottom plate 1 through anchor (tie) elements 2 and adjustable and electrically insulated by means of wing bolts.

Cylindrical portion or element 3 is embedded into the refractory material of the furnace bottom, said material having a substantially lower electrical conductivity than the material of elements 3 and 4. The outlet as such is mounted in an aperture of the refractory material 18 of the furnace bottom, and a not illustrated supply line and press-fitted electrodes connect the annular or circular element 4 to a power source.

The bottom outlet according to the invention allows current to flow through elements 3 and 4 towards the exiting flow of molten material such that the temperature of the latter is in this way adapted to be controlled as desired. By means of the temperature, furthermore the viscosity and, thus, the rate of discharge of this flow are adjustable such that the discharge quantity may be controlled independently of the level of the molten material bath. Upon stopping the discharge, it is further possible to prevent complete "freezing", i.e. a temperature reduction to such extent that current can no longer flow through the material of the melt, by continuing to maintain a small current flow. Thus, upon restarting it is only necessary to increase the amount of current flowing through the material, whereby the outlet will be opened automatically. It is surprising to the expert that the current flow through elements 3 and 4 acting as conductors, does not exclusively result in heating of the outlet, but also allows to control the outlet up to full blocking thereof. It is self-evident to the expert that a counter electrode 19 is provided above or adjacent the outlet within the mass of molten material contained in the tank, such that the desired current flow through elements 3 and 4 and through the molten material existing within center apertures 15 and 16 may take place.

Of particular advantage is the fact that an absolutely symmetrical energy supply to the outflowing stream of molten material takes place interiorly of the outlet, and that a perfectly symmetrical current flow within such stream can be provided. Inhomogeneities of temperature are thereby avoided. Furthermore, it is decisive that the temperature of the material surrounding the stream of molten material may be controlled by the resistive heating taking place therein without requiring separate heater elements, such that heat losses are avoided and heating-up following the closing of the outlet is facilitated, too.

Figure 3:
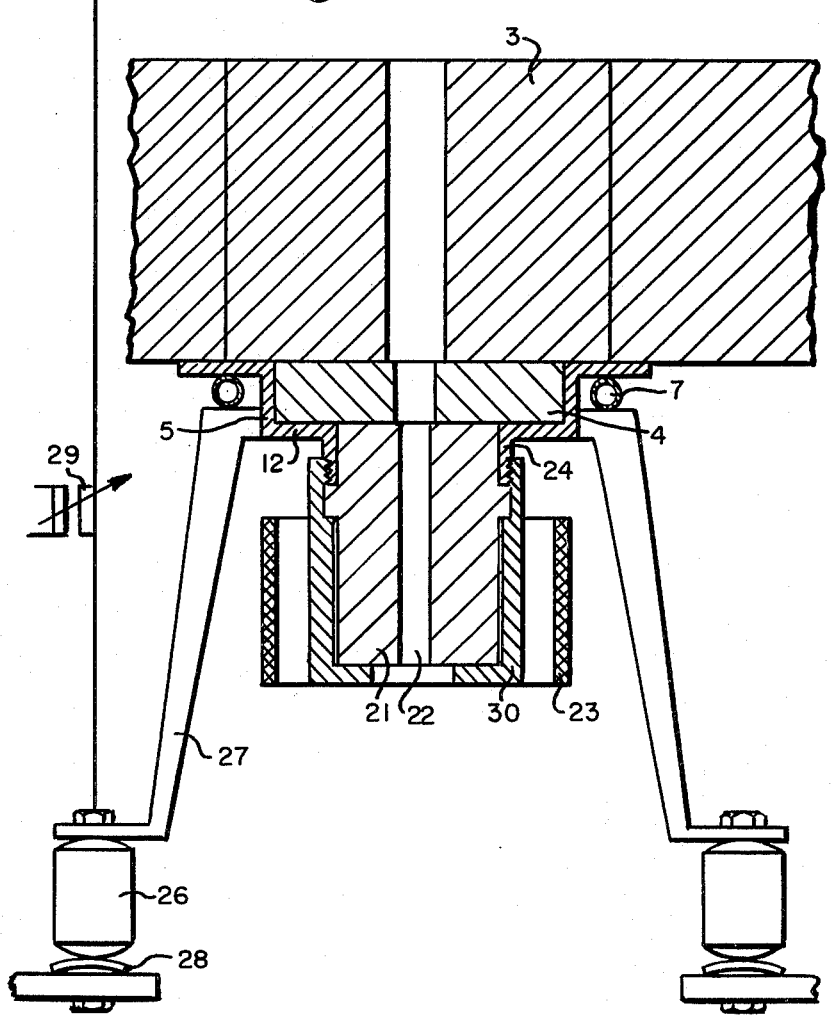
FIG. 3 is a vertical sectional view of a modified bottom outlet according to the present invention.

The present outlet as shown in FIG. 3 likewise includes an apertured element 3 forming part of the furnace bottom and having electrical current flowing directly therethrough so as to act as a heating conductor or current conductor, respectively. Power is supplied to element 3 through bottom plate 12 which is provided with an annular flange having mounted therein the further circular disc-shaped element 4 which is likewise formed of a refractory material being conductive at high temperature. A transformer 29 is used as the power source, with the one end of the secondary coil of said transformer being connected to at least one counter or opposite electrode 25 which extends into the molten mass in the tank above the outlet, and the opposite end of the secondary coil being connected to anchor or tie elements 27 of conductive metal serving to support the bottom plate 12.

Anchor elements 27 rest an insulators 26 which are mounted by means of resilient (spring) elements 28 in order to compensate for length variations caused by thermal elongation.

Below the bottom plate 12, exteriorly and above the upper ends of anchor elements 27, pipelines or a ring main conduit 7 for water cooling purposes are provided, such that the respective portion may be sufficiently cooled.

Furthermore, bottom plate 12 carries on the inner edge thereof a depending annular flange 24 on which a sleeve 30 may be mounted by threaded connection. The sleeve 30 has inserted therein another cylindricyl part 21 of refractory material having aperture 22 which part can be readily replaced along with the sleeve simply by unscrewing the latter from the flange. Sleeve 30 is surrounded by a spaced induction coil 23 fed with high-frequency alternating current supplied by a not illustrated voltage source; by induction, any desired current flow through sleeve 30 may be produced so as to control the temperature in this area as desired.

In a modified embodiment of the invention, the cylindrical part 21 in the form of a separate component may be omitted; this means that a component is threadingly inserted which is throughout formed of metal, e.g. of Inconel or high temperature steel. This structure is particularly advantageous in the case of insensitive mineral substances, insensitive glasses and of relatively low discharge temperatures.

In order to facilitate control, the bore or aperture in element 3 has a greater diameter than that of the circular disc-shaped element 4, whereas the bore or aperture 22 in element 21 has a smaller diameter than that of the circular disc-shaped element 4, such that the molten mass, when discharged, flows through a gradually restricted passage.

Evidently, in the outlet according to the invention the temperature in the various portions of the outlet or in different regions thereof, respectively, may be adjusted as desired by means of the cooling passage and the two heating paths in the refractory material or by means of the sleeve 30, respectively, such that the volume discharged can be controlled within an adequate range even in discontinuous operation.

When the lower end of the outlet should become "frozen", the temperature may be sufficiently raised by means of sleeve 30 even in the area of such lower end, so that it is unnecessary to provide for excessive heating in the region of the furnace bottom in element 3. Thus, any unintentional leakage of molten material through the joints in the area of the outlet is prevented from occuring. For this reason, operation of the outlet is rendered highly safe, and a melting furnace according to the invention may be operated with bottom outlets only, such that it is unnecessary to provide a lateral outlet or a feeder involving high thermal losses.

Of course, however, the outlet according to the invention may be provided also below a feeder head or any other glass-carrying passage or channel.

What we claim is:

1. In an electrically heated melting furnace for the melting of mineral materials, such as frits, enamels and the like or glass, wherein a bath of molten material contained in a tank is heated by means of electrodes contacting the molten material and having a current flowing therethrough which heats the molten material by Joule's heat, wherein a batch is fed onto the melt or molten bath, and the molten product is withdrawn from the bottom of the tank, the improvement wherein the furnace tank receiving the molten bath has the cross-section of a regular polygon; a plurality of heating elements are arranged above the batch material, and heating electrodes are positioned in the lower portion of the molten bath above the tank bottom; and an outlet port for the molten material is disposed in the tank bottom and comprises a bottom outlet including a cylindrical element, a further underlying, concentrically disposed, circular disc-shaped element of a refractory material being conductive at high temperature and acting as an electrical conductor, which elements are conductively coupled to a current supply line, a metallic annular element retaining the circular disc-shaped element and having a bottom plate portion for supporting same, a shell of a heat resistant metal disposed below said bottom plate portion, a cylindrical part of refractory material inserted in the shell and having a central aperture and an induction coil through which high-frequency alternating current flows surrounding the shell with a space therebetween.

2. The bottom outlet according to claim 1, further comprising an annular cooling water passage disposed below said bottom plate portion and adjacent the outer edge thereof.

3. The bottom outlet according to claim 2, wherein said circular disc shaped element, the metallic annular element, and said annular cooling water passage are disposed within an aperture in the refractory material of the tank bottom.

4. The bottom outlet according to claim 1, wherein said annular element has a threaded depending flange portion and said shell is adapted to be threaded onto the depending annular flange portion of said annular element.

5. The bottom outlet according to claim 1, wherein said annular disc-shaped element has a central aperture, said cylindrical element has a central aperture having a greater diameter than that of said annular disc-shaped element, the cylindrical part has a central aperture and the aperture of said disc-shaped element is wider than the aperture of the cylindrical part.

6. The bottom outlet according to claim 1, wherein said annular element is supported by resiliently mounted and insulated anchor elements.

* * * * *